(12) United States Patent
Choi et al.

(10) Patent No.: US 10,273,361 B2
(45) Date of Patent: *Apr. 30, 2019

(54) CONDUCTIVE POLYAMIDE/POLYPHENYLENE ETHER RESIN COMPOSITION AND AUTOMOTIVE MOLDED ARTICLE MANUFACTURED THEREFROM

(71) Applicant: Lotte Advanced Materials Co., Ltd., Yeosu-si (KR)

(72) Inventors: Won Young Choi, Uiwang-si (KR); Doo Young Kim, Uiwang-si (KR); Jung Hun Lee, Uiwang-si (KR); Won Ko, Uiwang-si (KR); Chang Min Hong, Uiwang-si (KR)

(73) Assignee: Lotte Advanced Materials Co., Ltd., Yeosu-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/108,702

(22) PCT Filed: Dec. 30, 2014

(86) PCT No.: PCT/KR2014/013024
§ 371 (c)(1),
(2) Date: Jun. 28, 2016

(87) PCT Pub. No.: WO2015/105296
PCT Pub. Date: Jul. 16, 2015

(65) Prior Publication Data
US 2016/0326369 A1 Nov. 10, 2016

(30) Foreign Application Priority Data
Jan. 9, 2014 (KR) .................. 10-2014-0002930

(51) Int. Cl.
| C08L 77/06 | (2006.01) |
| H01B 1/24 | (2006.01) |
| C08L 71/12 | (2006.01) |
| H01B 1/12 | (2006.01) |
| C08L 77/02 | (2006.01) |
| C08K 5/1539 | (2006.01) |
| C08K 7/24 | (2006.01) |
| C08L 51/06 | (2006.01) |
| C08L 53/02 | (2006.01) |

(52) U.S. Cl.
CPC ............ *C08L 77/06* (2013.01); *C08K 5/1539* (2013.01); *C08K 7/24* (2013.01); *C08L 51/06* (2013.01); *C08L 53/02* (2013.01); *C08L 71/12* (2013.01); *C08L 77/02* (2013.01); *H01B 1/128* (2013.01); *H01B 1/24* (2013.01)

(58) Field of Classification Search
None
See application file for complete search history.

(56) References Cited

U.S. PATENT DOCUMENTS

| 5,021,510 A | 6/1991 | Vroomans |
| 5,591,382 A | 1/1997 | Nahass et al. |
| 5,643,502 A | 7/1997 | Nahass et al. |
| 5,651,922 A | 7/1997 | Nahass et al. |
| 5,741,846 A | 4/1998 | Lohmeijer et al. |
| 5,843,340 A | 12/1998 | Silvi et al. |
| 5,977,240 A | 11/1999 | Lohmeijer et al. |
| 6,171,523 B1 | 1/2001 | Silvi et al. |
| 6,221,283 B1 | 4/2001 | Dharmarajan et al. |
| 6,331,592 B1 * | 12/2001 | Wong .................... C08F 255/00 525/179 |
| 6,352,654 B1 | 3/2002 | Silvi et al. |
| 6,469,093 B1 | 10/2002 | Koevoets et al. |
| 6,486,255 B2 | 11/2002 | Koevoets et al. |

(Continued)

FOREIGN PATENT DOCUMENTS

| CN | 101928454 A | 12/2010 |
| DE | 102009020090 | * 11/2010 |

(Continued)

OTHER PUBLICATIONS

Office Action in counterpart Korean Application No. 10-2014-0002930 dated Jun. 1, 2016, pp. 1-6.
International Search Report in counterpart International Application No. PCT/KR2014/013024 dated Mar. 13, 2015, pp. 1-4.
Campbell et al., "Poly(Phenylene Oxide)/Polyamide Blends via Reactive Extrusion", Polymer Engineering and Science, Mid-Sep. 1990, vol. 30, No. 17, pp. 1056-1062.
Office Action in commonly owned European Application No. 16164150.1 dated May 26, 2017, pp. 1-4.
Supplementary Search Report in commonly owned European Application No. 14883992.1 dated Jul. 24, 2017, pp. 1-11.

(Continued)

*Primary Examiner* — Tanisha Diggs
(74) *Attorney, Agent, or Firm* — Additon, Higgins & Pendleton, P.A.

(57) ABSTRACT

The present invention relates to a conductive polyamide/polyphenylene ether resin composition and an automotive molded article manufactured therefrom. The conductive polyamide/polyphenylene ether resin composition comprises: (a) a base resin comprising (a-1) polyphenylene ether and (a-2) polyamide; (b) a modified polyolefin based resin; (c) an impact modifier; (d) a compatibilizer; and (e) a conductive filler, and the conductive polyamide/polyphenylene ether resin composition is formed in a domain phase and a matrix phase, wherein the domain phase comprises (a-1) the polyphenylene ether and (c) the impact modifier and the matrix phase comprises (a-2) the polyamide and (b) the modified polyolefin based resin, (e) the conductive filler being dispersed on the domain phase and the matrix phase and the content of the conductive filler dispersed on the matrix phase being higher than that of the conductive filler dispersed on the domain phase.

8 Claims, No Drawings

(56) References Cited

U.S. PATENT DOCUMENTS

| | | | |
|---|---|---|---|
| 6,593,411 | B2 | 7/2003 | Koevoets et al. |
| 6,599,446 | B1 | 7/2003 | Todt et al. |
| 6,936,652 | B2 | 8/2005 | van Bennekom et al. |
| 7,022,776 | B2 | 4/2006 | Bastiaens et al. |
| 7,226,963 | B2 | 6/2007 | Koevoets et al. |
| 7,540,980 | B2 | 6/2009 | Noda et al. |
| 8,168,008 | B2 | 5/2012 | Miyata et al. |
| 8,168,088 | B2 | 5/2012 | Vergelati et al. |
| 2002/0009589 | A1 | 1/2002 | Bang et al. |
| 2003/0130406 | A1 | 7/2003 | van Bennekom et al. |
| 2006/0122310 | A1 | 6/2006 | Matthijssen |
| 2007/0235697 | A1 | 10/2007 | Borade et al. |
| 2007/0238832 | A1 | 10/2007 | Borade et al. |
| 2010/0327234 | A1 | 12/2010 | Shim et al. |
| 2011/0165336 | A1* | 7/2011 | Bradley ............. C08K 3/04 427/458 |
| 2012/0214932 | A1 | 8/2012 | Huh et al. |
| 2013/0316160 | A1 | 11/2013 | Hata et al. |
| 2015/0031834 | A1* | 1/2015 | Kobayashi ......... C08L 77/02 525/58 |
| 2015/0361591 | A1 | 12/2015 | Watanabe et al. |
| 2016/0300639 | A1 | 10/2016 | Choi et al. |
| 2016/0326369 | A1 | 11/2016 | Choi et al. |
| 2017/0066889 | A1 | 3/2017 | Hong et al. |

FOREIGN PATENT DOCUMENTS

| | | | |
|---|---|---|---|
| EP | 0506386 | A2 | 9/1992 |
| EP | 0685527 | A1 | 12/1995 |
| EP | 3093853 | A1 | 11/2016 |
| EP | 3112402 | A1 | 1/2017 |
| JP | 02-201811 | A | 8/1990 |
| JP | 04-300956 | A | 10/1992 |
| JP | 08-508534 | A | 9/1996 |
| JP | 2756548 | A | 3/1998 |
| JP | 2756545 | B2 | 5/1998 |
| JP | 10-310695 | A | 11/1998 |
| JP | 2001-302911 | A | 10/2001 |
| JP | 2002-146205 | | 5/2002 |
| JP | 2002-544308 | A | 12/2002 |
| JP | 2003-528941 | A | 9/2003 |
| JP | 2003-277607 | A | 10/2003 |
| JP | 2003-531944 | A1 | 10/2003 |
| JP | 2005-508425 | A | 3/2005 |
| JP | 2009-074043 | A | 4/2009 |
| JP | 2009-532547 | A | 9/2009 |
| JP | 2011-162753 | A | 8/2011 |
| KR | 10-2007-0073965 | A | 7/2007 |
| KR | 10-0792783 | B1 | 1/2008 |
| KR | 10-2008-0109806 | A | 12/2008 |
| KR | 10-2013-0113118 | A | 10/2013 |
| KR | 10-2015-0068752 | | 6/2015 |
| WO | WO 9914273 | A1 * | 3/1999 ............. C08L 25/06 |
| WO | 00/68299 | | 11/2000 |
| WO | 02/37507 | A1 | 5/2002 |
| WO | 03/40224 | A1 | 5/2003 |
| WO | 2005-026260 | A1 | 3/2005 |
| WO | 2015/105296 | A1 | 7/2015 |
| WO | 2015/129962 | A1 | 9/2015 |

OTHER PUBLICATIONS

Communication including supplementary European Search Report in counterpart European Application No. 14878240.2 dated Aug. 29, 2017, pp. 1-8.
Search Report in commonly owned European Application No. 16164150.1 dated Jul. 26, 2016, pp. 1-7.
International Search Report in commonly owned International Application No. PCT/KR2014/004856 dated Nov. 24, 2014, pp. 1-4.
Third Party Submission in commonly owned U.S. Appl. No. 15/121,834, filed May 30, 2017, pp. 1-15.
Office Action in commonly owned U.S. Appl. No. 15/090,917 dated Jun. 28, 2017, pp. 1-21
Office Action in commonly owned Korean Application No. 10-2016-0018068 dated Nov. 11, 2017, pp. 1-8.
Office Action in commonly owned Japanese Application Serial No. 2016-572217 dated Mar. 20, 2018, pp. 1-4.
Office Action in commonly owned Chinese Application No. 201480076439.0 dated Oct. 19, 2018, pp. 1-8.
Office Action in commonly owned U.S. Appl. No. 15/121,834 dated Sep. 6, 2018, pp. 1-9.
Final Office Action in commonly owned U.S. Appl. No. 15/121,834 dated Mar. 1, 2019, pp. 1-10.

* cited by examiner

CONDUCTIVE POLYAMIDE/POLYPHENYLENE ETHER RESIN COMPOSITION AND AUTOMOTIVE MOLDED ARTICLE MANUFACTURED THEREFROM

CROSS-REFERENCE TO RELATED APPLICATIONS

This application claims priority to and the benefit of International Application No. PCT/KR2014/013024, filed Dec. 30, 2014, which published as WO 2015/105296 on Jul. 16, 2015, and Korean Patent Application No. 10-2014-0002930, filed in the Korean Intellectual Property Office on Jan. 9, 2014, the entire disclosure of each of which is incorporated herein by reference.

TECHNICAL FIELD

The present invention relates to a conductive polyamide/polyphenylene ether resin composition and a molded article for automobiles produced using the same, and, more particularly, to a conductive polyamide/polyphenylene ether resin composition which exhibits excellent properties in terms of impact resistance and conductivity, and a molded article for automobiles produced using the same.

BACKGROUND ART

Plastic materials have various advantages, such as lightness, design flexibility and moldability, despite lower thermal resistance and flame resistance than metals or ceramics, and thus are widely used as materials in a variety of products from daily supplies to industrial fields including automobiles and electric/electronic products.

There are various types of plastic materials from commodity plastics to engineering plastics that are widely used in various fields requiring various functions and performances.

Among these plastic materials, polyphenylene ether has excellent electrical and mechanical properties and high thermal deflection temperature to be used as engineering plastics in various fields.

Polyphenylene ether was developed by General Electric in the U.S.A., and is used in the form of blends with high impact resistance polystyrenes as useful industrial materials, based on excellent thermal resistance thereof. Recently, polyphenylene ether is used in alloy form such as polypropylene/polyphenylene ether obtained by adding a polyamide/polyphenylene ether resin and a compatibilizer as a third component, followed by reaction extrusion for compatibilization of non-compatible blends through a chemical process.

Particularly, polyamide/polyphenylene ether can effectively remedy shortcomings of each resin component, thereby exhibiting good balance between thermal resistance, impact resistance and chemical resistance, and is thus employed in exterior components of automobiles, such as a hubcap, a junction box, and the like, and engine compartment components of automobiles.

Recently, there is a need for a plastic material for exterior components which allows on-line electrostatic plating such that electrostatic plating can be simultaneously performed on the plastic material and other metal components. In order to meet such a need, a conductive polyamide/polyphenylene ether resin developed by General Electric can be applied to automobile fender components (EP 685527 B1)

Such a conductive polyamide/polyphenylene ether resin can allow plastic exterior components formed of the resin to be subjected to electrostatic painting simultaneously with other metal material components to eliminate a need for an additional painting process, thereby reducing production costs.

In order to impart electrical conductivity to the polyamide/polyphenylene ether alloy, it is suggested that conductive fillers such as carbon fibers and carbon black be added thereto (JP H04-300956 A). However, carbon fibers can cause deterioration in formability and typical carbon black must be added in a large amount in order to achieve electrical conductivity for application to electrostatic plating, thereby causing deterioration in impact resistance and formability.

In order to overcome these problems of impact resistance and formability, nanoscale carbon fibers (carbon fibrils) or conductive carbon black having adjusted size are used (JP 2756548 B2). However, this method has a problem of deterioration in compatibility of the polyamide/polyphenylene ether resin.

In order to prepare a polyamide/polyphenylene ether resin having excellent physical properties without deterioration in compatibility, it is important to secure efficient compatibilization between a polyphenylene ether, a polyamide, and a compatibilizer upon extrusion.

In a typical method, in order to secure efficient compatibilization, first, the polyamide and the polyphenylene ether are compatibilized, followed by adding conductive carbon black thereto (EP 685527 B1).

However, this method is performed using special extrusion facilities including a plurality of side feeders and requires a particular sequence of adding the polyamide/polyphenylene ether alloys, the compatibilizer and other additives. Thus, this method is uneconomical due to expensive facility investment and has low productivity due to restriction on the sequence of adding raw materials.

Therefore, in order to solve the above problems, the inventors carried out studies to develop a conductive polyamide/polyphenylene ether resin composition, which can maintain excellent inherent properties of the polyamide and the polyphenylene ether, is applicable to on-line electrostatic plating, and has improved properties and economic feasibility.

DISCLOSURE

Technical Problem

The present invention have been conceived to solve such problems in the related art and it is an object of the present invention to provide a conductive polyamide/polyphenylene ether resin composition which exhibits excellent properties in terms of impact resistance and conductivity though adjustment of a degree of dispersion of conductive fillers and thus can be applied to electrostatic painting, and a molded article manufactured using the same.

It is another object of the present invention to provide a conductive polyamide/polyphenylene ether resin composition which can exhibit excellent properties in terms of impact resistance and conductivity though adjustment of components of the resin composition even when conductive fillers are added to the resin composition, followed by melt-kneading, without compatibilization of a polyphenylene ether and a polyamide in advance through kneading, and a molded article manufactured using the same.

Technical Solution

In accordance with one embodiment of the present invention, a conductive polyamide/polyphenylene ether resin composition includes: (a) a base resin including (a-1) a polyphenylene ether and (a-2) a polyamide; (b) a modified polyolefin resin; (c) an impact modifier; (d) a compatibilizer; and (e) conductive fillers, wherein the conductive polyamide/polyphenylene ether resin composition is composed of a domain phase and a matrix phase; the domain phase includes the polyphenylene ether (a-1) and the impact modifier (c); the matrix phase includes the polyamide (a-2) and the modified polyolefin resin (b); and the conductive fillers (e) are dispersed in the domain phase and the matrix phase and the conductive fillers are dispersed in the matrix phase in larger amounts than in the domain phase.

The base resin (a) may include 10 wt % to 65 wt % of the polyphenylene ether (a-1) and 35 wt % to 90 wt % of the polyamide (a-2), and the conductive polyamide/polyphenylene ether resin composition may include 1 to 15 parts by weight of the modified polyolefin resin (b), 1 to 15 parts by weight of the impact modifier (c), 0.2 to 10 parts by weight of the compatibilizer (d), and 0.1 to 5 parts by weight of the conductive fillers (e) relative to 100 parts by weight of the base resin (a).

The conductive fillers (e) may be at least one of carbon black and carbon fibrils.

The polyphenylene ether (a-1) may include at least one selected from the group consisting of poly(2,6-dimethyl-1,4-phenylene) ether, poly(2,6-diethyl-1,4-phenylene) ether, poly(2,6-dipropyl-1,4-phenylene) ether, poly(2-methyl-6-ethyl-1,4-phenylene) ether, poly(2-methyl-6-propyl-1,4-phenylene) ether, poly(2-ethyl-6-propyl-1,4-phenylene) ether, poly(2,6-diphenyl-1,4-phenylene) ether, a copolymer of poly(2,6-dimethyl-1,4-phenylene) ether and poly(2,3,6-trimethyl-1,4-phenylene) ether, a copolymer of poly(2,6-dimethyl-1,4-phenylene) ether and poly(2,3,6-triethyl-1,4-phenylene) ether, and a combination thereof.

The polyamide (a-2) may include at least one selected from the group consisting of polyamide 6, polyamide 66, polyamide 46, polyamide 11, polyamide 12, polyamide 610, polyamide 612, polyamide 6/66, polyamide 6/612, polyamide MXD6, polyamide 6/MXD6, polyamide 66/MXD6, polyamide 6T, polyamide 6I, polyamide 6/6T, polyamide 6/6I, polyamide 66/6T, polyamide 66/6I, polyamide 6/6T/6I, polyamide 66/6T/6I, polyamide 9T, polyamide 9I, polyamide 6/9T, polyamide 6/9I, polyamide 66/9T, polyamide 6/12/9T, polyamide 66/12/9T, polyamide 6/12/9I, polyamide 66/12/6I, and a combination thereof.

The modified polyolefin resin (b) may be a phase transfer agent for moving the conductive fillers (e) from the domain phase to the matrix phase.

The modified polyolefin resin (b) may be at least one of a low density polyethylene and a modified low density polyethylene obtained through modification of the low density polyethylene with a compound selected from $\alpha,\beta$-unsaturated dicarboxylic acids and $\alpha,\beta$-unsaturated dicarboxylic acid derivatives.

The impact modifier (c) may include at least one selected from the group consisting of a block copolymer composed of an aromatic vinyl compound and a conjugated diene compound, a hydrogenated block copolymer obtained by hydrogenation of the block copolymer composed of the aromatic vinyl compound and the conjugated diene compound, a modified block copolymer obtained by modification of the block copolymer with a compound selected from the group consisting of $\alpha,\beta$-unsaturated dicarboxylic acids and $\alpha,\beta$-unsaturated dicarboxylic acid derivatives, and a modified hydrogenated block copolymer obtained by modification of the hydrogenated block copolymer with a compound selected from among $\alpha,\beta$-unsaturated dicarboxylic acids and $\alpha,\beta$-unsaturated dicarboxylic acid derivatives.

The compatibilizer (d) may include at least one selected from the group consisting of maleic acid, maleic anhydride, maleic hydrazide, dichloro maleic anhydride, unsaturated dicarboxylic acid, fumaric acid, citric acid, citric acid anhydride, malic acid, and agaricic acid.

The conductive polyamide/polyphenylene ether resin composition may be prepared by preparing a conductive polyphenylene ether resin composition through melt kneading of the polyphenylene ether (a-1), the modified polyolefin resin (b), the impact modifier (c), the compatibilizer (d) and the conductive fillers (e), and adding the polyamide (a-2) to the conductive polyphenylene ether resin composition, followed by melt kneading.

The conductive polyamide/polyphenylene ether resin composition may have a falling dart impact strength of 25J to 80J as measured in accordance with ASTM D3763.

The conductive polyamide/polyphenylene ether resin composition may have a surface resistance of $10\Omega/\square$ to $10^{11}\Omega/\square$.

In accordance with another embodiment of the present invention, a molded article for automobiles is produced using the conductive polyamide/polyphenylene ether resin composition as set forth above.

Advantageous Effects

A conductive polyamide/polyphenylene ether resin composition according to the present invention can exhibit improved properties in terms of impact resistance and conductivity through adjustment of the content of conductive fillers dispersed in a matrix phase and a domain phase.

The conductive polyamide/polyphenylene ether resin composition according to the present invention employs an optimal phase transfer agent capable of moving the conductive fillers from a domain phase to a matrix phase in order to adjust a degree of dispersion of the conductive fillers, thereby providing excellent impact resistance by suppressing deterioration in mechanical properties while exhibiting sufficient conductivity even with a small amount of conductive fillers.

Further, the conductive polyamide/polyphenylene ether resin composition according to the present invention has an increased degree of freedom in selection of production means by reducing consumption of expensive conductive fillers, thereby providing excellent productivity and economic feasibility.

Therefore, according to the present invention, it is possible to provide a conductive polyamide/polyphenylene ether resin composition having excellent properties in terms of impact resistance and conductivity, and a molded article for automobiles produced using the same.

The present invention is not limited to the aforementioned effects, and other effects of the present invention not mentioned herein will be clearly understood by those skilled in the art from the claims.

BEST MODE

The above and other aspects, features, and advantages of the invention will become apparent from the detailed description of the following embodiments. However, it should be understood that the present invention is not limited to the following embodiments and may be embodied in various ways, and that the embodiments are given to provide complete disclosure of the present invention and to provide a thorough understanding of the present invention to those skilled in the art. The scope of the present invention is limited only by the accompanying claims and equivalents thereof. Like components will be denoted by like reference numerals throughout the specification.

Unless otherwise defined herein, all terms including technical or scientific terms used herein have the same meanings as commonly understood by those skilled in the art to which the present invention belongs. It will be further understood that terms defined in commonly used dictionaries should not be interpreted in an idealized or overly formal sense unless expressly so defined herein.

Hereinafter, a conductive polyamide/polyphenylene ether resin composition according to the present invention will be described.

The conductive polyamide/polyphenylene ether resin composition may include: a base resin (a) including a polyphenylene ether (a-1) and a polyamide (a-2); a modified polyolefin resin (b); an impact modifier (c); a compatibilizer (d); and conductive fillers (e).

Herein, a compatibilized blend refers to a composition physically or chemically compatibilized with a compatibilizer.

As used herein, the term "compatibility" means a degree of compatibilization. A higher compatibility indicates a higher degree of compatibilization and a lower compatibility indicates a lower degree of compatibilization.

Next, each of components of the conductive polyamide/polyphenylene ether resin composition will be described in more detail.

(a) Base Resin

The conductive polyamide/polyphenylene ether resin composition according to the present invention is a blend of a polyphenylene ether and a polyamide, in which a morphology composed of a matrix phase and a domain phase can be formed.

Herein, the matrix phase refers to a continuous phase surrounding dispersed phases and the domain phase refers to a discontinuous phase corresponding to the matrix. The matrix phase and the domain phase may also be referred to as a continuous phase and a dispersed phase, respectively. Herein, the matrix may be interchangeably used with the continuous phase and the domain may be interchangeably used with the dispersed phase.

The base resin (a) may include the polyphenylene ether (a-1) and the polyamide (a-2).

The polyphenylene ether may form the domain phase and the polyamide may form the matrix phase.

(a-1) Polyphenylene Ether

The polyphenylene ether (a-1) may include at least one selected from the group consisting of a polyphenylene ether polymer, a mixture of the polyphenylene ether polymer and an aromatic vinyl polymer, a modified polyphenylene ether polymer obtained through reaction of the polyphenylene ether polymer with a reactive monomer, and a combination thereof.

The polyphenylene ether polymer may include at least one selected from the group consisting of poly(2,6-dimethyl-1,4-phenylene) ether, poly(2,6-diethyl-1,4-phenylene) ether, poly(2,6-dipropyl-1,4-phenylene) ether, poly(2-methyl-6-ethyl-1,4-phenylene) ether, poly(2-methyl-6-propyl-1,4-phenylene) ether, poly(2-ethyl-6-propyl-1,4-phenylene) ether, poly(2,6-diphenyl-1,4-phenylene) ether, a copolymer of poly(2,6-dimethyl-1,4-phenylene) ether and poly(2,3,6-trimethyl-1,4-phenylene) ether, a copolymer of poly(2,6-dimethyl-1,4-phenylene) ether and poly(2,3,6-triethyl-1,4-phenylene) ether, and a combination thereof.

Preferably, the polyphenylene ether polymer is poly(2,6-dimethyl-1,4-phenylene) ether or a copolymer of poly(2,6-dimethyl-1,4-phenylene) ether and poly(2,3,6-trimethyl-1,4-phenylene) ether, more preferably poly(2,6-dimethyl-1,4-phenylene) ether.

The aromatic vinyl polymer may include at least one selected from the group consisting of styrene, p-methylstyrene, α-methylstyrene, 4-n-propylstyrene, and a combination thereof, and preferably, styrene, α-methylstyrene, or a combination thereof are used as the aromatic vinyl compound.

The reactive monomer is a compound including an unsaturated carboxylic acid or an anhydride group thereof, or a compound capable of being modified into the unsaturated carboxylic acid or the anhydride group thereof through reaction, and may form a modified polyphenylene ether polymer through reaction with the polyphenylene ether polymer according to one embodiment of the invention.

The reactive monomer may include at least one selected from the group consisting of citric acid, citric acid anhydride, maleic anhydride, maleic acid, itaconic anhydride, fumaric acid, (meth)acrylic acid, (meth)acrylic acid esters, and a combination thereof, without being limited thereto.

Considering high operation temperature, the modified polyphenylene ether polymer reacted with the reactive monomer can be effectively produced through graft reaction in a melt kneaded state using a phosphite-based heat stabilizer, without being limited thereto.

The polyphenylene ether according to one embodiment of the invention preferably has an intrinsic viscosity of 0.2 dl/g to 0.8 dl/g, more preferably about 0.3 dl/g to 0.6 dl/g, as measured in chloroform at 25° C.

With the polyphenylene ether having an intrinsic viscosity within this range, the polyamide/polyphenylene ether resin composition can exhibit good properties in terms of heat resistance, mechanical strength, and processability.

Preferably, the polyphenylene ether is present in an amount of 10 wt % to 65 wt %, more preferably about 20 wt % to 60 wt %, based on 100 wt % of the base resin including the polyamide. If the amount of the polyphenylene ether exceeds this content range, the polyamide/polyphenylene ether resin composition can suffer from deterioration in flexibility, chemical resistance, and processability.

(a-2) Polyamide

The polyamide (a-2) includes amino acid, lactam, or diamine, and dicarboxylic acid as main monomer components.

Examples of the main monomer components may include amino acids such as 6-aminocapronic acid, 11-aminoundecanoic acid, 12-aminododecanoic acid, p-aminomethyl benzoic acid, and the like; lactams such as ε-caprolactam ω-laurolactam, and the like; aliphatic, alicyclic, and aromatic diamines such as tetramethylenediamine, hexamethylenediamine, 2-methylpentamethylenediamine, nonamethylenediamine, undecamethylenediamine, dodecamethylenediamine, 2,2,4-/2,4,4-trimethylhexamethylenediamine, 5-methylnonamethylenediamine, m-xylylenediamine, p-xylylenediamine, 1,3-bis(aminomethyl)cyclohexane, 1,4-bis(aminomethyl)cyclohexane, 1-amino-3-aminomethyl-3,5,5-trimethylcyclohexane, bis(4-aminocyclohexyl)methane, bis(3-methyl-4-aminocyclohexyl)methane, 2,2-bis(4-aminocyclohexyl)

propane, bis(aminopropyl)piperazine, aminoethylpiperazine, and the like; aliphatic, alicyclic, and aromatic dicarboxylic acids such as adipic acid, suberic acid, azelaic acid, sebacic acid, dodecanoic acid, terephthalic acid, isophthalic acid, 2-chloroterephthalic acid, 2-methylterephthalic acid, 5-methylisophthalic acid, 5-sodium sulfoisophthalic acid, 2,6-naphthalene dicarboxylic acid, hexahydroterephthalic acid, hexahydroisophthalic acid, and the like. Polyamide homopolymers or copolymers derived from these materials may be used alone or as a mixture thereof.

Specifically, the polyamide may include at least one selected from the group consisting of polyamide 6, polyamide 66, polyamide 46, polyamide 11, polyamide 12, polyamide 610, polyamide 612, polyamide 6/66, polyamide 6/612, polyamide MXD6, polyamide 6/MXD6, polyamide 66/MXD6, polyamide 6T, polyamide 6I, polyamide 6/6T, polyamide 6/6I, polyamide 66/6T, polyamide 66/6I, polyamide 6/6T/6I, polyamide 66/6T/6I, polyamide 9T, polyamide 9I, polyamide 6/9T, polyamide 6/9I, polyamide 66/9T, polyamide 6/12/9T, polyamide 66/12/9T, polyamide 6/12/9I, polyamide 66/12/6I, and a combination thereof.

The polyamide may have a melting point of 220° C. to 360° C., preferably 230° C. to 320° C., more preferably 240° C. to 300° C.

The polyamide may have a relative viscosity of 2 dl/g or more, preferably about 2 dl/g to 4 dl/g in terms of mechanical strength and heat resistance. Herein, relative viscosity is a value measured at 25° C. after adding 1 wt % of the polyamide to m-cresol.

Preferably, the polyamide is present in an amount of 35 wt % to 90 wt %, more preferably 40 wt % to 80 wt %, based on 100 wt % of the base resin including polyphenylene ether. If the content of the polyamide exceeds this range, the conductive polyamide/polyphenylene ether resin composition can suffer from deterioration in compatibility, mechanical strength, and heat resistance.

(b) Modified Polyolefin Resin

The modified polyolefin resin (b) may include at least one selected from the group consisting of a high density polyethylene, a low density polyethylene, a linear low density polyethylene, an ethylene-α-olefin copolymer, and a combination thereof. In addition, the modified polyolefin resin (b) may include a modified high density polyethylene, a modified low density polyethylene, a modified linear low density polyethylene, and a modified ethylene-α-olefin copolymer, which are obtained by modification of the above compounds with at least one compound of α,β-unsaturated dicarboxylic acids and α,β-unsaturated dicarboxylic acid derivatives. In some embodiments, a mixture of these modified polyolefin resins can also be used.

Preferably, at least one of a low density polyethylene and a modified low density polyethylene is used.

The modified polyolefin resin may be a copolymer obtained by polymerization of an olefin-based monomer or a copolymer obtained by polymerization of the olefin-based monomer and an acrylic monomer.

The olefin-based monomer may include a $C_1$ to $C_{19}$ alkylene, for example, ethylene, propylene, iso-propylene, butylene, isobutylene, or octane, and these monomers may be used alone or as a mixture thereof.

The acrylic monomer may be an alkyl (meth)acrylic acid ester or (meth)acrylic acid. Herein, "alkyl" means a $C_1$ to $C_{10}$ alkyl, and examples of the alkyl (meth)acrylic acid ester may include methyl (meth)acrylate, ethyl (meth)acrylate, propyl (meth)acrylate, and butyl (meth)acrylate, and preferably methyl (meth)acrylate is used as the acrylic monomer.

Preferably, the modified polyolefin resin includes a reactive group capable of reacting with the polyamide, and the modified polyolefin resin may have a structure in which the reactive group is grafted to a main chain composed of the olefin-based monomer or the copolymer of the olefin-based monomer and the acrylic monomer.

The reactive group may be a maleic anhydride group or an epoxy group.

In some embodiments, the modified polyolefin resin including the reactive group may be a maleic anhydride group-grafted modified ethylene-α-olefin copolymer or modified low density polyethylene. These components improve compatibility of the polyphenylene ether and the polyamide.

The conductive polyamide/polyphenylene ether resin composition according to the embodiment of the invention is prepared by adding the polyamide to a conductive polyphenylene ether resin composition obtained by melt kneading the polyphenylene ether with the modified polyolefin resin, conductive fillers and a compatibilizer, in which the conductive fillers are dispersed in the polyphenylene ether in preparation of the conductive polyphenylene ether resin composition.

When the polyamide is added to the conductive polyphenylene ether resin composition, the modified polyolefin resin serves to move the conductive filler from the domain phase including the polyphenylene ether to the matrix phase including the polyamide and thus can be referred to as a kind of phase transfer agent.

By such activity of the modified polyolefin resin, the conductive fillers directly affect improvement in conductivity of the conductive polyamide/polyphenylene ether resin composition while being present in the matrix phase.

Preferably, the modified polyolefin resin is present in an amount of 1 to 15 parts by weight, more preferably 2.5 to 10 parts by weight, relative to 100 parts by weight of the base resin. If the content of the modified polyolefin resin exceeds this range, it is difficult for the modified polyolefin resin to move the conductive fillers from the domain phase to the matrix phase, thereby causing significant deterioration in conductivity of the conductive polyamide/polyphenylene ether resin composition.

(c) Impact Modifier

The impact modifier (c) can improve impact resistance of the conductive polyamide/polyphenylene ether resin composition.

The impact modifier may include a styrene elastomer.

The styrene elastomer may be selected from among a block copolymer composed of an aromatic vinyl compound and a conjugated diene compound; a hydrogenated block copolymer obtained by hydrogenation of the block copolymer composed of the aromatic vinyl compound and the conjugated diene compound; a modified block copolymer obtained by modification of the block copolymer with a compound selected from the group consisting of α,β-unsaturated dicarboxylic acids and α,β-unsaturated dicarboxylic acid derivatives; and a modified hydrogenated block copolymer obtained by modification of the hydrogenated block copolymer with a compound selected from among α,β-unsaturated dicarboxylic acids and α,β-unsaturated dicarboxylic acid derivatives; and a combination thereof. These may be used alone or in combination thereof.

The aromatic vinyl compound may include at least one selected from the group consisting of styrene, p-methylstyrene, α-methylstyrene, bromostyrene, chlorostyrene, and a combination thereof. Most preferably, the aromatic vinyl compound is styrene.

The styrene elastomer is derived from the aromatic vinyl compound, and may include not only linear structures including diblock (A-B block), triblock (A-B-A block), tetrablock (A-B-A-B block) and pentablock (A-B-A-B-A block) structures, but also linear structures containing a total of six A and B blocks or more.

Examples of the styrene elastomer may include a styrene-ethylene-butylene-styrene copolymer, a styrene-butadiene-styrene copolymer, a styrene-ethylene-propylene-styrene copolymer, a styrene-isoprene-styrene copolymer, a styrene-ethylene copolymer, and a styrene-ethylene-butadiene-styrene copolymer; and a modified styrene-ethylene-butylene-styrene copolymer, a modified styrene-butadiene-styrene copolymer, a modified styrene-ethylene-propylene-styrene copolymer, a modified styrene-isoprene-styrene copolymer, a modified styrene-ethylene copolymer, and a modified styrene-ethylene-butadiene-styrene copolymer, which are obtained by modification of the above compounds with at least one compound selected from the group consisting of $\alpha,\beta$-unsaturated dicarboxylic acids and $\alpha,\beta$-unsaturated dicarboxylic acid derivatives. These may be used alone or as a mixture thereof. Most preferably, the styrene elastomer is a styrene-ethylene-butylene-styrene copolymer.

Preferably, the impact modifier is present in an amount of 1 to 15 parts by weight, more preferably about 2.5 to 10 parts by weight, relative to 100 parts by weight of the base resin. Within this range, the impact modifier can significantly improve impact resistance of the conductive polyamide/polyphenylene ether resin composition.

(d) Compatibilizer

The compatibilizer (d) may be a compound containing two types of functional groups or a compound capable of being modified by the compound containing two types of functional groups through reaction. One of the functional groups may be a carbon-carbon double bond or a carbon-carbon triple bond, and the other type may be selected from among a carboxyl group, an acid anhydride, an epoxy group, an imide group, an amide group, an ester group, an acid chloride, and functional equivalents thereof.

Examples of the compatibilizer may include maleic acid, maleic anhydride, maleic hydrazide, dichloro maleic anhydride, unsaturated dicarboxylic acid, fumaric acid, citric acid, citric acid anhydride, malic acid, and agaricic acid. These may be used alone or as a mixture thereof.

Preferably, the compatibilizer is maleic acid, maleic anhydride, fumaric acid, citric acid, or citric acid anhydride, more preferably maleic anhydride or citric acid anhydride.

The compatibilizer or a modified compound of the compatibilizer generates a polyphenylene ether/polyamide block copolymer through reaction with the polyphenylene ether and the polyamide.

The block copolymer is distributed at an interface between two components in the polyamide/polyphenylene ether resin composition to stabilize morphology of the resin composition. Particularly, in the morphology of the polyamide/polyphenylene ether resin composition in which the polyphenylene ether forms domains phases (dispersed phases) and the polyamide forms the matrix phase (continuous phase), it appears that the block copolymer plays an important role in regulating the particle diameters of the domains to 1 μm, at which effective impact resistance can be obtained (Polymer Engineering and Science, 1990, vol. 30, No. 17, p. 1056-1062).

The compatibilizer may be present in an amount of 0.2 to 10 parts by weight relative to 100 parts by weight of the base resin in the polyamide/polyphenylene ether resin composition. Within this content range of the compatibilizer, the electrically conductive polyamide/polyphenylene ether resin composition can exhibit good properties in terms of compatibility, impact resistance, and the like. If the content of the compatibilizer is less than 0.2 parts by weight, the conductive polyamide/polyphenylene ether resin composition can have insignificant improvement in impact resistance, and if the content of the compatibilizer exceeds 10 parts by weight, the compatibilizer can deteriorate other physical properties without improvement in impact resistance.

(e) Conductive Filler

The conductive fillers (e) are dispersed in the polyamide/polyphenylene ether resin composition and can impart conductivity thereto.

The conductive fillers may be at least one of carbon black and carbon fibrils.

Carbon black may be conductive carbon black, for example, graphite, furnace black, acetylene black or Ketjen black, without being limited thereto.

Carbon fibril is a fiber shape carbon material containing 90 wt % or more of carbon.

Preferably, the carbon fibrils are carbon nanotubes. The carbon nanotubes have great aspect ratio and specific surface area, exhibit excellent properties in terms of mechanical properties, electrical properties, and thermal properties, and thus are evaluated as effective materials for engineering plastics.

The carbon nanotubes can be classified into single-wall, double-wall and multi-wall carbon nanotubes according to the number of walls, or can be classified into a zigzag structure, an armchair structure, and a chiral structure according to an angle at which a graphene plane is wrapped. However, it should be understood that various kinds of carbon nanotubes may be used without being limited to the kind and structure of the carbon nanotubes. Preferably, multi-wall carbon nanotubes are used.

The carbon nanotubes may have a diameter of 0.5 nm to 100 nm, preferably 1 nm to 10 nm, and a length of 0.01 μm to 100 μm, preferably 0.5 μm to 10 μm, without being limited thereto. Within these diameter and length ranges, the carbon nanotubes can provide further improved properties to the conductive polyamide/polyphenylene ether resin composition in terms of electrical conductivity and processability.

Within these diameter and length ranges, the carbon nanotubes have a high aspect ratio (L/D), and may have an aspect ratio of about 100 to about 1,000 to improve electrical conductivity of the conductive polyamide/polyphenylene ether resin composition.

The conductive fillers may be dispersed both in the domain phases and in the matrix phase such that the amount of the carbon fillers dispersed in the matrix phase is greater than the amount of the carbon fillers dispersed in the domain phases.

The carbon fillers are moved from the domain phases to the matrix phase due to the presence of the modified polyolefin resin, and preferably, the amount of the carbon fillers dispersed in the matrix phase is greater than the amount of the carbon fillers dispersed in the domain phases. More preferably, the carbon fillers dispersed in the matrix phase are present in an amount of 51 wt % to 100 wt % based on 100 wt % of the polyamide/polyphenylene ether resin composition, most preferably, all of the carbon fillers present in the domain phases of the polyphenylene ether are moved to the matrix comprising the polyamide to optimize improvement in electrical conductivity of the polyamide/polyphenylene ether resin composition.

If the amount of the conductive fillers dispersed in the domain phases is greater than the amount of the carbon fillers dispersed in the matrix phase, there can be a problem of significant deterioration in electrical conductivity.

The conductive polyamide/polyphenylene ether resin composition may further include additives such as a flame retardant, a lubricant, a plasticizer, a heat stabilizer, an antioxidant, a photostabilizer, a colorant, inorganic fillers, and a combination thereof, as needed.

The flame retardant is a material for reducing flammability and may include at least one selected from the group consisting of a phosphate compound, a phosphite compound, a phosphonate compound, a polysiloxane compound, a phosphazene compound, a phosphinate compound, and a melamine compound, without being limited thereto.

The lubricant is a material capable of assisting in flow or movement of the resin composition by lubricating a metal surface contacting the conductive polyamide/polyphenylene ether resin composition during machining, molding or extrusion, and may be selected from any typical lubricants used in the art.

The plasticizer is a material capable of improving flexibility, machining workability or expansion of the conductive polyamide/polyphenylene ether resin composition and may be selected from any typical lubricants used in the art.

The heat stabilizer is a material capable of suppressing thermal decomposition of the conductive polyamide/polyphenylene ether resin composition upon kneading or molding at high temperature, and may be selected from typical lubricants used in the art.

The antioxidant is a material capable of preventing the resin composition from being decomposed and losing inherent properties thereof by suppressing or preventing chemical reaction of the conductive polyamide/polyphenylene ether resin composition with oxygen, and may include at least one of phenol, phosphite, thioether and amine antioxidants, without being limited thereto.

The photostabilizer is a material capable of suppressing or preventing color change or loss of mechanical properties of the conductive polyamide/polyphenylene ether resin composition due to decomposition of the resin composition by UV light, and may include, for example, titanium oxide.

The colorant may be dyes or pigments.

The additives may be present in an amount of about 0.1 to about 10 parts by weight relative to 100 parts by weight of the base resin. If the content of the additives exceeds this range, the conductive polyamide/polyphenylene ether resin composition can suffer from deterioration in mechanical properties and a molded article produced using the conductive polyamide/polyphenylene ether resin composition can have external appearance defects.

Although the conductive polyamide/polyphenylene ether resin composition according to the embodiment of the invention can also be prepared by a well-known method in the art, it is possible to prepare a conductive polyamide/polyphenylene ether resin composition having excellent properties, since the aforementioned compounds are added in specific amounts as the components of the resin composition without influence on formation of a compatibilized blend even when the conductive fillers are added before compatibilization of the polyphenylene ether and the polyamide.

Specifically, a conductive polyphenylene ether resin composition is prepared through melt kneading of the polyphenylene ether (a-1), the modified polyolefin resin (b), the impact modifier (c), the compatibilizer (d) and the conductive fillers (e), and then the polyamide (a-2) is added to the conductive polyphenylene ether resin composition, followed by melt kneading, thereby providing a conductive polyamide/polyphenylene ether resin composition exhibiting good compatibilization between the polyphenylene ether and the polyamide.

Here, upon melt kneading with the polyamide, the conductive fillers dispersed in the polyphenylene ether are moved to the polyamide constituting the matrix phase by the modified polyolefin resin such that a number of conductive fillers can be dispersed in the matrix phase, thereby realizing good conductivity even with a smaller amount of the conductive fillers than a conventional technique.

The conductive polyamide/polyphenylene ether resin composition having the components in the specific amounts according to the embodiments of the invention has good impact resistance.

Preferably, the polyamide/polyphenylene ether resin composition has a falling dart impact strength of 25J to 80J, more preferably 35J to 80J, as measured in accordance with ASTM D3763.

Herein, the falling dart impact strength means an average value of fracture energy values, as measured by repeating measurement of fracture energy 20 times by dropping a dart from a falling dart impact strength tester onto a specimen.

Within this range of falling dart impact strength, the polyamide/polyphenylene ether resin composition can exhibit optical mechanical properties for molded articles.

Although a thermoplastic resin composition is generally evaluated as to Izod impact strength in the related art, Izod impact strength is suitable for isotropic metal and has many problems in measurement of impact resistance of polymers. Thus, in the present invention, impact resistance of the conductive polyamide/polyphenylene ether resin composition can be accurately evaluated based on falling dart impact strength.

For a thermoplastic resin composition such as the conductive polyamide/polyphenylene ether resin composition according to the present invention, since impact behavior depends on hitting speed due to viscoelasticity thereof, total fracture energy can be measured by applying impact to a specimen of the conductive polyamide/polyphenylene ether resin composition from a predetermined height.

In addition, the conductive poly amide/polyphenylene ether resin composition having the components in the specific amounts according to the embodiments of the present invention has good conductivity.

Preferably, the conductive polyamide/polyphenylene ether resin composition has a surface resistance of $10\Omega/\square$ to $10^{11}\Omega/\square$, more preferably $10^2$ to $10^8\Omega/\square$. Within this range of surface resistance, the conductive polyamide/polyphenylene ether resin composition exhibits good conductivity.

Molded articles for automobiles according to embodiments of the present invention may be produced using the conductive polyamide/polyphenylene ether resin composition according to the present invention. The conductive polyamide/polyphenylene ether resin composition exhibits good impact resistance and conductivity, and thus can be applied to molded articles (components) for automobiles, such as automotive tail gates, automotive fuel doors, automotive fenders, and door panels, without being limited thereto.

EXAMPLES

Next, results of a test for demonstrating advantageous effects of the conductive polyamide/polyphenylene ether resin composition according to the present invention will be shown.

Details of components of conductive polyamide/polyphenylene ether resin compositions prepared according to the following Examples and Comparative Examples are as follows.

(a) Base Resin
(a-1) Polyphenylene Ether
Poly(2,6-dimethyl-1,4-phenylene)ether (Xyron S201A, Asahi Kasei Chemicals Co., Ltd.) was used.
(a-2) Polyamide
Polyamide 66 (Vydyne 22HSP, Ascend Performance Materials Co., Ltd.) was used.
(b) Modified Polyolefin Resin
(b-1) A maleic anhydride-modified ethylene-propylene copolymer was used.
(b-2) Maleic anhydride-modified low-density polyethylene was used.
(b-3) A maleic anhydride-modified ethylene-octene copolymer was used.
(c) Impact Modifier
A styrene-ethylene-butylene-styrene copolymer (SEBS) (KRATON G 1651, KRATON Polymers Co., Ltd.) was used.
(d) Compatibilizer
Maleic anhydride (Sigma-Aldrich GmbH) was used.
(e) Conductive Fillers
(e-1) Carbon nanotubes (FIBRIL, Hyperion Catalysis International, Inc.) were used.
(e-2) Carbon nanotubes (NC7000, Nanocyl S.A.) were used.

Conductive polyamide/polyphenylene ether resin compositions of Examples and Comparative Examples were prepared in amount ratios as listed in Table 1.

Components listed in a section "main feeding" of Table 1 were mixed in a dry state and continuously fed in a quantitative manner into a main feeding port of a twin-screw extruder (TEX-40, JSW Co. Ltd.). Components listed in a section "side feeding" of Table 1 were continuously fed in a quantitative manner into a side feeding port of the extruder, followed by melt kneading. Here, the extruder was set to a screw speed of 400 rpm and a throughput rate of 100 kg/hr. Then, a resin composition was obtained in pellet form through the extruder.

Herein, the side feeding port refers to a port close to a die of the extruder.

Amount of each component is represented in parts by weight based on 100 parts by weight of the base resin including (a-1) and (a-2).

TABLE 1

| Component | | Example | | | | Comparative Example | | | |
|---|---|---|---|---|---|---|---|---|---|
| | | 1 | 2 | 3 | 4 | 1 | 2 | 3 | 4 |
| Main feeding | a-1 | 37 | 37 | 42 | 32 | 37 | 37 | 42 | 32 |
| | b-1 | 5 | — | — | — | — | — | — | — |
| | b-2 | — | 5 | — | — | — | 5 | — | — |
| | b-3 | — | — | 4 | 6 | — | — | — | — |
| | c | 6 | 6 | 7 | 5 | 6 | 6 | 7 | 5 |
| | d | 0.3 | 0.3 | 0.3 | 0.3 | 0.3 | 0.3 | 0.3 | 0.3 |
| | e-1 | 1 | 1.2 | 0.6 | — | 1 | 1.2 | 0.6 | — |
| | e-2 | — | — | — | 1 | — | — | — | 1 |
| Side feeding | a-2 | 63 | 63 | 58 | 68 | 63 | 63 | 58 | 68 |
| | b-2 | — | — | — | — | 5 | 5 | — | — |
| | b-3 | — | — | — | — | — | — | 4 | 6 |

Each of the conductive polyamide/polyphenylene ether resin compositions prepared in Examples 1 and 4 and Comparative Examples 1 to 4 was evaluated as to degree of dispersion of conductive fillers in a matrix phase, falling dart impact strength, and surface resistance according to the following methods. Results are shown in Table 2.

<Falling Dart Impact Strength>

Falling dart impact strength of each of the conductive polyamide/polyphenylene ether resin compositions was measured on a specimen prepared by injection molding. The specimen was prepared at a cylinder temperature of 280° C. and a mold temperature of 80° C. using an injection molding machine including a mold having a specimen cavity (100 mm×100 mm×3 mm) (SELEX-TX150, Woojin Selex Co., Ltd.).

The resin compositions of Examples 1 to 4 and Comparative Examples 1 to 4 were subjected to injection molding under conditions of an injection pressure of 100 MPa, a pressure holding time of 5 sec, and a cooling time of 20 sec, thereby preparing 20 specimens for each of the resin compositions. The prepared specimens were left under conditions of about 23° C., relative humidity of about 50% for about 6 hours.

Falling dart impact strength was measured on the obtained specimen by measuring total energy (J) of falling dart impact strength at about 23° C., relative humidity of 50% using a falling dart impact strength tester (Fractovis Plus, CEAST Co., Ltd.) in accordance with ASTM D3763.

A head dart having a diameter of 12.7 mm and adjusted to a weight of 1 kg to 10 kg depending upon impact strength of each resin specimen was dropped onto the specimen from a height of 1 m, followed by measuring fracture energy of the specimen using a measuring instrument connected to the falling dart impact strength tester. For each of the resin compositions, fracture energy values were measured 20 times and averaged to obtain falling dart impact strength of each of the resin compositions.

In addition, a broken shape of the specimen was checked by observing the appearance of the specimen after dart falling impact testing and each of the resin compositions was evaluated to be "ductile" or "brittle" based on observation results.

<Surface Resistance>

Specimens for measurement of surface resistance were prepared through thermal compression molding. About 6 g of pellets prepared from each of the conductive polyamide/polyphenylene ether resin compositions of Examples 1 to 4 and Comparative Examples 1 to 4 was placed in a mold having a cavity of 100 mm×100 mm×0.5 mm, which in turn was placed between a pair of metal plates and inserted into a thermal compression molding machine set to about 300° C. After application of a pressure of about 50 kg/cm$^2$ to the mold and the metal plates for 3 minutes, the mold and the metal plates were removed from the thermal compression molding machine and inserted into a cooling compression molding machine set to about 25° C. After application of a pressure of about 50 kg/cm$^2$ to the mold and the metal plates for 2 minutes, the mold and metal plates were removed from the cooling compression molding machine, followed by separation of a specimen for measurement of surface resistance having a size of 100 mm×100 mm×0.5 mm from the mold and the pair of metal plates. The compression molded specimen was left under conditions of about 23° C., relative humidity of 50% for about 6 hours.

Surface resistance of each of the polyamide/polyphenylene ether resin compositions of Examples 1 to 4 and Comparative Examples 1 to 4 was measured at about 23° C., relative humidity of 50% using a resistance measurement system Hiresta-UP MCP-HT450 provided with a probe MCP-HTP14 (produced by Mitsubishi Chemical Analytech Co.). During measurement, voltage of the system was maintained at 250 V for 30 seconds. Surface resistance was measured 5 times for each specimen, followed by averaging the measured values.

<Degree of Dispersion of Conductive Filler>

A middle portion of a specimen prepared in the same manner as in falling dart impact strength testing was cut to obtain 1 g of a sample for measurement of the content of conductive fillers dispersed in domain phases including a polyphenylene ether and in a matrix phase including a polyamide.

The sample was immersed in 50 ml of formic acid and refluxed in a 100 ml flask for 2 hours, followed by cooling and centrifugation. The mixture was divided into three layers: a top layer of undissolved polyphenylene ether domain phases and other undissolved materials, a clean interlayer of a formic acid-polyamide solution, and a bottom layer of precipitated conductive fillers in the matrix phase.

The undissolved materials of the top layer were removed from the mixture using a pipette and collected in another flask. The formic acid-polyamide solution of the interlayer was removed from the mixture, and the precipitated conductive fillers in the matrix phase were rinsed with formic acid three times and then with acetone three times, followed by vacuum drying and measuring the weight of the conductive fillers.

The collected undissolved materials of the top layer were placed in 50 ml of a solution containing toluene and chloroform in a volume ratio of 70:30, followed by agitation and centrifugation for 2 hours so as to precipitate the conductive fillers present in the domain phases. Then, a solvent component was removed and the precipitated conductive fillers were rinsed with a solution containing toluene and chloroform in a volume ratio of 70:30 three times and then with acetone three times, followed by vacuum drying and measuring the weight of the conductive fillers.

The amount of the conductive fillers dispersed in the matrix phase is represented in % by weight based on the total weight (100%) of the conductive fillers present in the conductive polyamide/polyphenylene ether resin composition.

resin compositions thus exhibited excellent conductivity and had improved compatibility of the base resin, thereby providing excellent impact resistance.

Particularly, in Example 2, in which maleic anhydride-modified low-density polyethylene was used as the modified polyolefin resin, the content of conductive fillers dispersed in the matrix phase was highest, and the resin composition of Example 2 thus had considerably low surface resistance while exhibiting excellent falling dart impact strength.

In addition, it can be seen that, although the same modified polyolefin resin was used as a phase transfer agent, it was difficult to move the conductive fillers to the matrix phase when the modified polyolefin resin was fed through the side feeding port together with the polyamide after melt kneading of the polyphenylene ether and the conductive fillers instead of being fed through the main feeding port, given that the content of conductive fillers in the matrix phase was low (Comparative Examples 1, 3, and 4).

In other words, the resin compositions of Comparative Examples had a very low content of the conductive fillers dispersed in the matrix phase and significantly high surface resistance as compared with those of Examples. Further, the resin compositions of Comparative Examples had considerably low falling dart impact strength. It is believed that this result is caused by a large amount of the conductive fillers present in the domain phases including the polyphenylene ether and disturbing compatibilization with the polyamide.

It should be understood that the present invention is not limited to the above embodiments and can be realized in various ways without departing from the appended claims. It should be understood that various modifications, changes, and alterations can be made by those skilled in the art without departing from the spirit and scope of the present invention, as defined by the appended claims and equivalents thereof.

INDUSTRIAL APPLICABILITY

The conductive polyamide/polyphenylene ether resin composition according to the present invention exhibits

TABLE 2

|  | Example | | | | Comparative Example | | | |
| --- | --- | --- | --- | --- | --- | --- | --- | --- |
|  | 1 | 2 | 3 | 4 | 1 | 2 | 3 | 4 |
| Amount of conductive filler in matrix phase (wt %) | 73 | 82 | 76 | 55 | 25 | 15 | 22 | 12 |
| Falling dart impact strength (J) | 55 | 60 | 70 | 40 | 18 | 20 | 16 | 23 |
| Broken shape | Ductile | Ductile | Ductile | Ductile | Brittle | Brittle | Brittle | Brittle |
| Surface resistance ($\Omega/\square$) | $10^{5.1}$ | $10^{2.6}$ | $10^{6.7}$ | $10^{5.2}$ | $>10^{12}$ | $>10^{12}$ | $>10^{12}$ | $>10^{12}$ |

From the results shown in Tables 1 and 2, it can be seen that, in the conductive polyamide/polyphenylene ether resin compositions of Examples 1 to 4, a larger amount of conductive fillers was dispersed in the matrix phase and exhibited excellent impact resistance and conductivity.

In the conductive polyamide/polyphenylene ether resin compositions of Examples 1 to 4 prepared according to the composition and amount ratio of the present invention, the content of conductive fillers dispersed in the matrix phase was higher than in the domain phases, that is, a majority of conductive fillers were present in the matrix region, and the good impact resistance and conductivity and thus can be effectively applied to electrostatic plating and molded articles for automobiles.

The invention claimed is:

1. A conductive polyamide/polyphenylene ether resin composition, comprising:
   (a) a base resin comprising (a-1) a polyphenylene ether and (a-2) a polyamide; (b) a modified polyolefin resin, wherein the modified polyolefin resin (b) is maleic anhydride-modified low density polyethylene; (c) an impact modifier wherein the impact modifier (c) comprises styrene-ethylene-butylene-styrene copolymer; (d) a compatibilizer wherein the compatibilizer (d) comprises maleic anhydride; and (e) carbon nanotubes, wherein the conductive polyamide/polyphenylene ether resin composition is composed of a domain phase and a matrix phase, the domain phase comprising the polyphenylene ether (a-1) and the impact modifier (c), the matrix phase comprising the polyamide (a-2) and the modified polyolefin resin (b), the carbon nanotubes (e) are dispersed in the domain phase and the matrix phase, the carbon nanotubes being dispersed in a larger amount in the matrix phase than in the domain phase, wherein the conductive polyamide/polyphenylene ether resin composition is prepared by preparing a conductive polyphenylene ether resin composition through melt kneading of the polyphenylene ether (a-1), the modified polyolefin resin (b), the impact modifier (c), the compatibilizer (d) and the carbon nanotubes (e), and adding the polyamide (a-2) to the conductive polyphenylene ether resin composition, followed by melt kneading, and wherein the conductive polyamide/polyphenylene ether resin composition has a falling dart impact strength of 25 J to 80 J as measured in accordance with ASTM D3763 and a surface resistance of 10 $\Omega$/square to $10^{11}$ $\Omega$/square wherein the base resin (a) comprises 10 wt % to 65 wt % of the polyphenylene ether (a-1) and 35 wt % to 90 wt % of the polyamide (a-2), the conductive polyamide/polyphenylene ether resin composition comprising:

1 to 15 parts by weight of the modified polyolefin resin (b), 1 to 15 parts by weight of the impact modifier (c), 0.2 to 10 parts by weight of the compatibilizer (d), and 0.1 to 5 parts by weight of the carbon nanotubes (e), relative to 100 parts by weight of the base resin (a).

2. The conductive polyamide/polyphenylene ether resin composition according to claim 1, wherein the polyphenylene ether (a-1) comprises at least one selected from the group consisting of poly(2,6-dimethyl-1,4-phenylene) ether, poly(2,6-diethyl-1,4-phenylene) ether, poly(2,6-dipropyl-1,4-phenylene) ether, poly(2-methyl-6-ethyl-1,4-phenylene) ether, poly(2-methyl-6-propyl-1,4-phenylene) ether, poly(2-ethyl-6-propyl-1,4-phenylene) ether, poly(2,6-diphenyl-1,4-phenylene) ether, a copolymer of poly(2,6-dimethyl-1,4-phenylene) ether and poly(2,3,6-trimethyl-1,4-phenylene) ether, a copolymer of poly(2,6-dimethyl-1,4-phenylene) ether and poly(2,3,6-triethyl-1,4-phenylene) ether, and combinations thereof.

3. The conductive polyamide/polyphenylene ether resin composition according to claim 1, wherein the polyamide (a-2) comprises at least one selected from the group consisting of polyamide 6, polyamide 66, polyamide 46, polyamide 11, polyamide 12, polyamide 610, polyamide 612, polyamide 6/66, polyamide 6/612, polyamide MXD6, polyamide 6/MXD6, polyamide 66/MXD6, polyamide 6T, polyamide 6I, polyamide 6/6T, polyamide 6/6I, polyamide 66/6T, polyamide 66/6I, polyamide 6/6T/6I, polyamide 66/6T/6I, polyamide 9T, polyamide 9I, polyamide 6/9T, polyamide 6/9I, polyamide 66/9T, polyamide 6/12/9T, polyamide 66/12/9T, polyamide 6/12/9I, polyamide 66/12/6I, and combinations thereof.

4. The conductive polyamide/polyphenylene ether resin composition according to claim 1, wherein the modified polyolefin resin (b) is a phase transfer agent for moving the carbon nanotubes (e) from the domain phase to the matrix phase.

5. The conductive polyamide/polyphenylene ether resin composition according to claim 1, wherein the impact modifier (c) further comprises at least one selected from the group consisting of a block copolymer composed of an aromatic vinyl compound and a conjugated diene compound that is different from the styrene-ethylene-butylene-styrene copolymer, a hydrogenated block copolymer obtained by hydrogenation of the block copolymer composed of the aromatic vinyl compound and the conjugated diene compound, a modified block copolymer obtained by modification of the block copolymer with a compound selected from the group consisting of $\alpha,\beta$-unsaturated dicarboxylic acids and $\alpha,\beta$-unsaturated dicarboxylic acid derivatives, and a modified hydrogenated block copolymer obtained by modification of the hydrogenated block copolymer with a compound selected from among $\alpha,\beta$-unsaturated dicarboxylic acids and $\alpha,\beta$-unsaturated dicarboxylic acid derivatives.

6. The conductive polyamide/polyphenylene ether resin composition according to claim 1, wherein the compatibilizer (d) further comprises at least one selected from the group consisting of maleic acid, maleic hydrazide, dichloro maleic anhydride, unsaturated dicarboxylic acid, fumaric acid, citric acid, citric acid anhydride, malic acid, and agaricic acid.

7. A molded article for automobiles produced using the conductive polyamide/polyphenylene ether resin composition according to claim 1.

8. The conductive polyamide/polyphenylene ether resin composition according to claim 1, wherein the conductive polyamide/polyphenylene ether resin composition has a falling dart impact strength of 35 J to 80 J as measured in accordance with ASTM D3763 and a surface resistance of $10^2$ $\Omega$/square to $10^8$ $\Omega$/square.

* * * * *